United States Patent Office 2,701,355
Patented Feb. 1, 1955

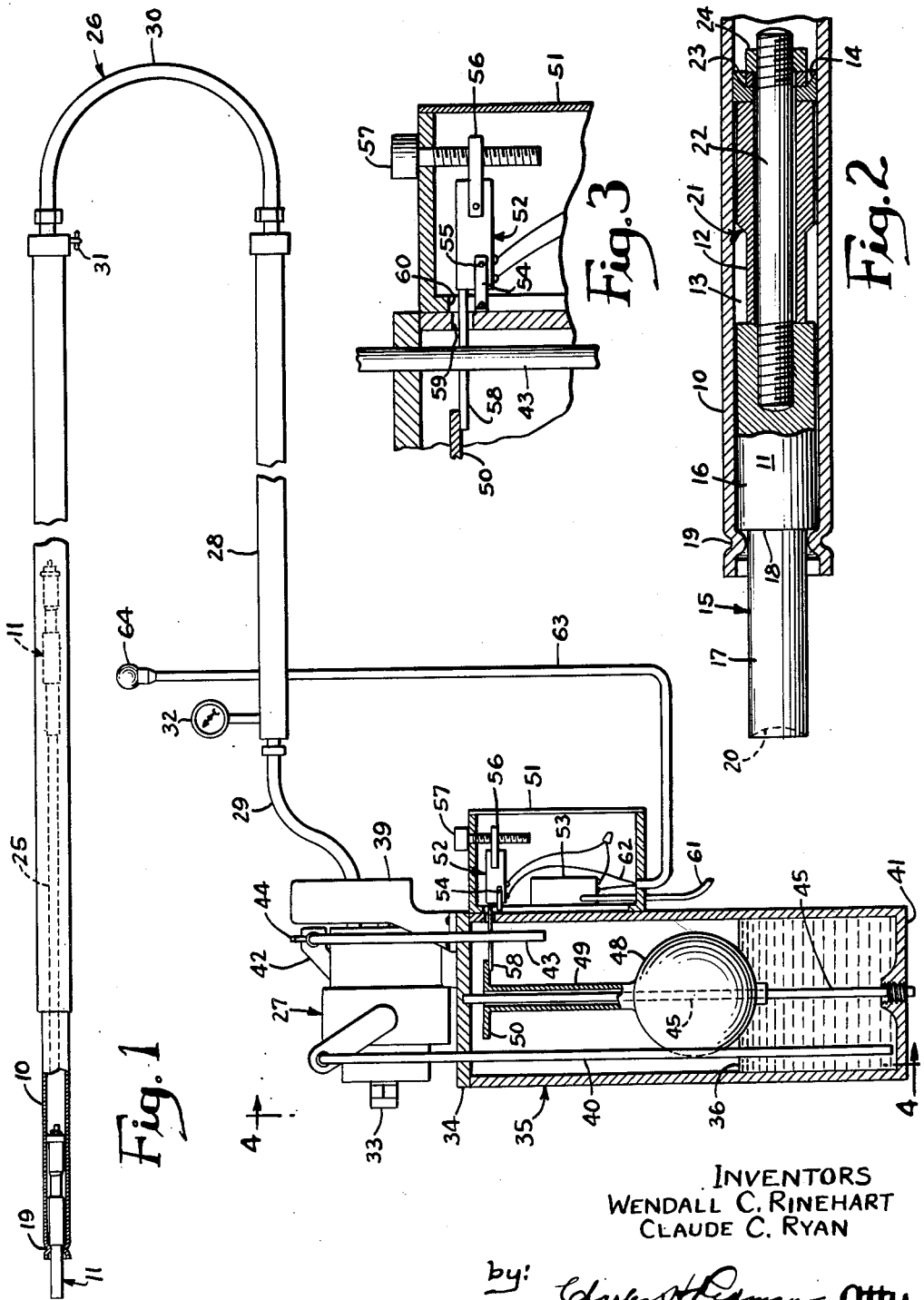

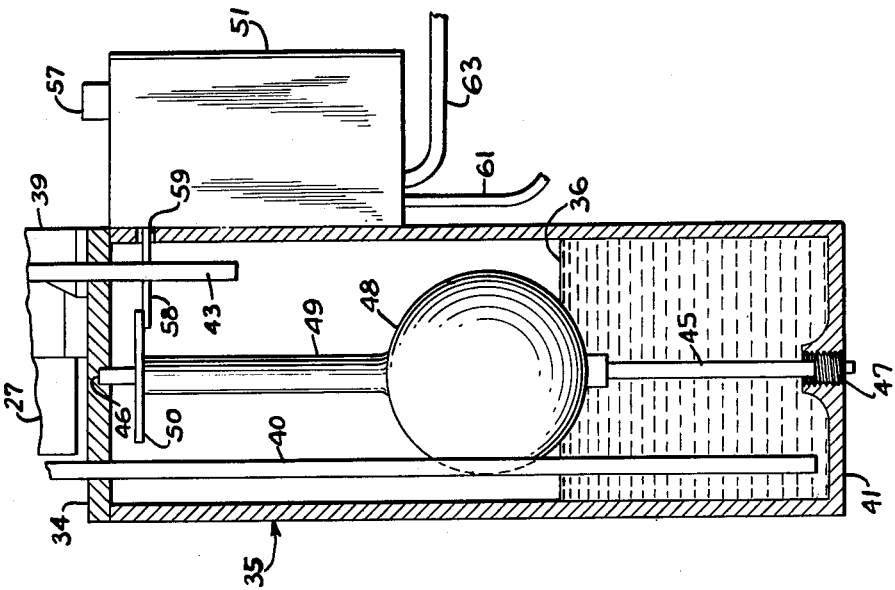
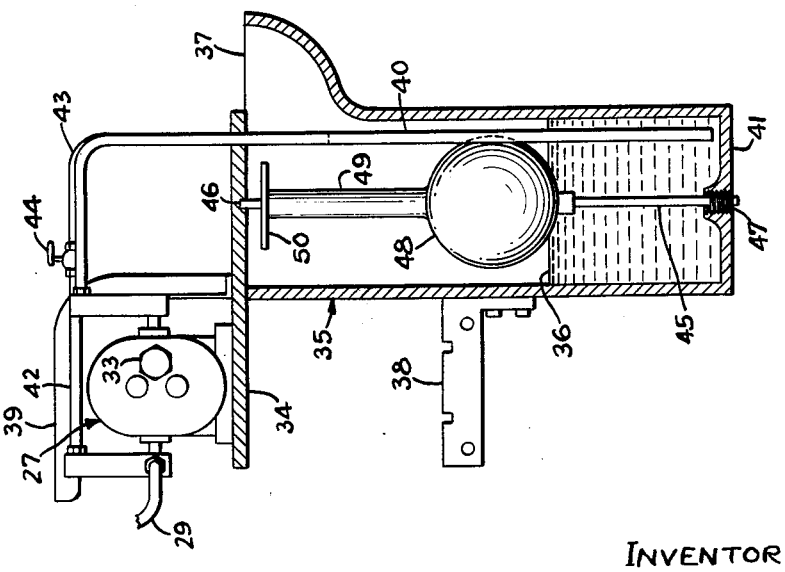

2,701,355

STOCK FEEDING MECHANISM INDICATOR DEVICE

Wendall C. Rinehart, St. Charles, and Claude C. Ryan, Batavia, Ill., assignors, by mesne assignments, to Boyar-Schultz Corporation, Chicago, Ill., a corporation of Illinois Original application July 26, 1950, Serial No. 176,046. Divided and this application October 11, 1952, Serial No. 314,395

7 Claims. (Cl. 340—244)

This invention relates to stock feeding mechanism for use with machines which require being fed with long lengths of stock to be worked upon, and, more particularly to an indicator device for locating the stock within the mechanism as shown and described in our co-pending application Serial No. 176,046, filed July 26, 1950, of which this is a divisional application.

The apparatus of this invention provides constant pressure on a length of stock being fed to a machine. Briefly described, our invention consists of a supporting guideway for a length of stock, a piston for maintaining a feeding pressure against the stock, mechanism for adjustably controlling the feeding pressure, and an adjustable indicator means by which the operator is informed when the stock is near the end of the feed or is entirely fed to the working machine. In the preferred embodiment of the invention shown, feeding pressure is exerted through a fluid, such as oil or the like.

In the original embodiment of the invention, oil from the machine on which the stock is fed to be worked on was used for the stock feeding mechanism. This was unsatisfactory in that the oil was found to contain such foreign matter as chips, shavings and other particles of material resulting from the work performed on the stock which foreign matter abraded, scored or otherwise damaged the interior surfaces of the stock feeding mechanism, thereby quickly destroying its efficiency or rendering it inoperative.

It is, therefore, an important object of this invention to provide a feeding mechanism adapted for use with a machine to be fed with stock and which feeding mechanism has an independent or self-contained source of fluid, for purposes of minimizing adulteration, through which feeding pressure is exerted.

Another object of the invention is to provide a mechanism having an improved feeding means for advancing a relatively long piece of stock to a machine in which work is to be performed on the stock.

A further object of the invention is to provide a feeding mechanism adapted to handle any length of stock up to a maximum and limited only by the length of a supporting guideway.

A still further object of the invention is to provide a stock feeding mechanism, for advancing a length of stock to a work machine, including an adjustable fluid pressure system through which a desired feeding pressure is obtained.

Still another object of this invention is to provide a mechanism, for feeding stock to a machine in which work is to be performed on the stock, with adjustable means for indicating the approach or the arrival of a predetermined point on the stock at or near a selected point along said support.

Another and still further object of the invention is to provide in a stock feeding mechanism an improved stock supporting guideway therefor.

Other and further objects of the invention will become apparent to those skilled in the art from the following detailed description of the preferred embodiment of the invention as disclosed in the annexed sheets of drawings.

On the drawings:

Figure 1 is a broken side elevational view, with portions broken away and in vertical cross-section for better illustrating details of construction, of the stock feeding mechanism of this invention;

Figure 2 is an enlarged fragmentary vertical cross-sectional view, with parts broken away and in elevation, showing details of construction of a feeding piston and a stop therefor at the end of the stock supporting guideway;

Figure 3 is an enlarged fragmentary detail elevation of an adjustable electric switch mechanism;

Figure 4 is a vertical cross-sectional view, with parts in elevation, taken along the line 4—4 of Figure 1; and, Figure 5 is an enlarged fragmentary vertical cross-sectional view, with parts in elevation, showing details of construction of the fluid tank and float construction.

As shown on the drawings:

To better understand the invention as illustrated herein, it may be explained that a work machine, with which the stock feeding mechanism of this invention is associated, forms no part of this invention. The stock, under constant pressure, is uniformly advanced to the work machine. Where an intermittent or other than a constant feed of stock is required, the arrangement therefor is provided in the work machine.

The stock to be fed may be bars or tubes of any configuration limited only in cross-sectional size by the internal diameter of the stock supporting guideway and in length not to excessively exceed that of the guideway. This will become more apparent from the following detailed description.

In the top portion of Figure 1 and in Figure 2, are shown a guideway 10. The guideway is tubular and of a length sufficient to receive therein a major portion of the maximum length of stock to be fed to a work machine. Although not shown, it is intended that the guideway be mounted upon or attached to a suitable support.

Within the guideway is a free reciprocating piston 11. The body of the piston has a reduced intermediate portion 12 providing a lubricant well 13 and at its inner end a seal 14, preferably of leather, composition, or any other suitable material inert to petroleum products. As shown, the piston body is of two-piece construction, one end 15 of which has an enlarged body portion 16 and a reduced shank 17 at the junction of which there is a shoulder 18.

As best seen in Figure 2, the outer end of guideway 10 is peripherally crimped inwardly to provide a reduced section and a stop 19 against which shoulder 18 abuts to limit movement of the piston in a direction outwardly of the guideway.

A cup shaped depression 20, at the free end of the shank 17, serves to insure a more positive and centered abutment with the engaging end of the stock to be fed through the guideway.

The other or inner end 21 of the piston has its reduced shank 12 held in connected abutment with the body portion 16 of the other piston end by means of an axially threaded stud 22. One end of the stud extends through and beyond the seal 14 for a purpose now to be explained.

A washer 23, of smaller diameter than that of the seal, loosely embraces the stud 22 and a nut 24 is threaded to the end of the stud. As the nut is threaded along the stud, pressure exerted on the seal through the washer compresses the seal into a snug sliding fit with the inner surface of the guideway thereby acting as a slidable fluid seal. Adjustment of the seal fit may be varied as desired by the direction in which the nut is threaded on the stud.

The dotted lines in the guideway 10 of Figure 1 indicate the innermost position of the piston which is the position of parts at the start of the feeding cycle. This position of the piston is accomplished by forcing the piston rearwardly as the stock 25, to be fed by the mechanism of the invention, is forced into the guideway by hand. As shown in full lines, the piston is in a position in which the stock has been fully fed from the guideway to the work machine.

Pressure against the piston is exerted by means of a fluid pumped through a feed line 26 by a rotary pump 27. The feed line comprises a pipe 28 connected at one end to the pump by a flexible line 29 and at its other end to the guideway by another flexible line 30 through a valve 31. A pressure gauge 32 in the pipe line 28 indicates the pressure at which fluid is pumped through the feed line.

The rotary pump 27 is of any standard construction in which it is desirable that an automatic by-pass be provided. In the mechanism shown, there is a relief valve 33 for adjusting the pressure at which fluid is pumped. When the pressure of the fluid being pumped exceeds the pressure setting of the valve, the latter automatically connects the outlet and inlet sides of the pump to by-pass fluid sufficiently to maintain the desired pressure.

As shown, the pump is mounted on the cover 34 of a fluid tank 35. It is preferred that the pressure carrier be oil to provide lubricant in the stock guideway for the reciprocating piston. By providing a supply of oil separate from the associated work machine, danger of the oil becoming adulterated by chips, shavings or other particles, is minimized. Sufficient oil 36 is maintained in the tank through a filler opening 37 to exceed the capacity of the feed system.

The tank has a bracket 38 by which it is firmly mounted, preferably to the work machine with which it is associated. Although a driving mechanism, such as an electric motor or the like, may be provided to drive the rotary pump to effect an entirely self-contained feeding device, it is usually more feasible to connect the pump drive shaft to the associated work machine by means of a belt, chain, or other driving medium. Although this drive mechanism is not shown, there is illustrated a belt or chain guard 39.

An inlet pipe 40 extends from near the bottom wall 41 of the tank to the intake side of the pump. On the outlet side of the pump is a return fluid line 42 having an end 43 which extends into the tank just below the cover. This line has a valve 44 therein which, when opened, provides a by-pass from the outlet side of the pump to the tank, and, when closed, limits the connection of the tank and pump to the inlet pipe 40.

Within the fluid tank is a vertical guide rod 45 the upper end 46 of which is embedded in the cover 35 and the lower end in the bottom wall 41. A drain plug 47 threadedly engages an opening in the bottom wall of the tank to provide an outlet for the oil contained within the tank. If desired, the drain plug may be an enlarged end of the guide rod.

Slidingly mounted on the guide rod is a ball float 48 having a stem or tubular extension 49 terminating in a laterally extending base 50.

A switch box 51, carried by the tank, houses a switch 52 and a transformer 53. The switch is of the conventional make and break type which closes and opens an electric circuit. Spaced arms, only the arm 54 of which is shown, are attached to a side wall of the switch box and rockingly support the switch by means of a pivot 55. Another arm 56, carried by the switch, is threadedly engaged by a screw member 57 which extends through the top wall of the switch box. A switch actuator 58 extends from the switch through wall openings 59 and 60 and into overlapping relation with the base 50 of the ball float.

The transformer 53 serves to step down voltage from a main line 61 to a lighting circuit 62. This circuit extends through a conduit 63 which terminates in a lamp 64.

The operation of the mechanism will now be described. When stock has been fully advanced by the feeding mechanism the reciprocating piston engages the stop 19. A new length of stock is manually inserted in the guideway 10 by forcing the piston as far to the rear as the length of the stock requires. It will be noted that the size of the stock to be fed is limited by the size of the opening through the crimped stop. During this operation valves 31 and 44 are open whereby oil in the feeding lines is returned to the tank through the return fluid line 42. Following the insertion of the stock, the valve 44 is closed and the rotary pump started.

When a predetermined pressure is desired, the valve 31 is closed and the relief valve 33 adjusted as necessary. Advance of the stock is started by opening valve 31.

In order that the operator of the work machine, which is usually of the automatic type with one operator attending a number of them, be informed of the arrival of the end of the stock at or near the completion of the feeding cycle, the lamp 64 is so electrically connected as to light.

Switch 52 is adjusted on its pivot by the screw 57 to a position in which the base 50 of the ball float engages and rocks the actuator arm 58 into closing the switch circuit as the piston arrives at a predetermined location relative to the stock guideway. Usually, the points selected are the inner end of the stock and the stop at the outer end of the guideway. However, the mechanism is such as to be adjustable for the lamp to be lighted at other intermediate points either on the stock or guideway. While this is not possible by the limited adjustment of the switch, the limits may be extended by varying the level of the oil in the tank. A higher level of oil permits a longer advance of the stock before the lamp is lighted than will a lower level.

On completion of the feeding cycle, a new length of stock is inserted and the cycle restarted as described above.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In stock feeding mechanism, a device for indicating the arrival at a predetermined location in said mechanism of a point on a length of stock being fed therein by relation to a level of liquid, comprising a chamber in which to store a supply of liquid, means hydraulically connecting said chamber and stock feeding mechanism, other means maintaining liquid from said chamber under pressure to said stock feeding mechanism, an indicator instrument to indicate said arrival, additional means movable with the level of liquid in said chamber, and adjustable mechanism connecting said additional means and indicator instrument for actuating the instrument at a predetermined level of liquid in said chamber.

2. In stock feeding mechanism, a device for indicating the arrival at a predetermined location in said mechanism of a point on a length of stock being fed therein by relation to a level of liquid, comprising a chamber in which to store a supply of liquid, means hydraulically connecting said chamber and stock feeding mechanism, other means maintaining liquid from said chamber under pressure to said stock feeding mechanism, a float movable with the level of liquid, an indicator instrument, and additional means connecting said instrument and said float for actuating the instrument when the liquid reaches a predetermined level.

3. In stock feeding mechanism, a device for indicating the arrival at a predetermined location in said mechanism of a point on a length of stock being fed therein by relation to a level of liquid, comprising a chamber in which to store a supply of liquid, conduit means connecting said chamber and stock feeding mechanism, pump means maintaining liquid under pressure in said conduit means, an electric indicator when energized indicating the arrival of said point, a switch connecting said indicator and a source of energy, a float movable with the level of liquid in said chamber, and actuating means connecting said float and switch to energize said indicator when the liquid reaches a predetermined level in the chamber.

4. In stock feeding mechanism, a device for indicating the arrival at a predetermined location in said mechanism of a point on a length of stock being fed therein by relation to a level of liquid, comprising a chamber in which to store a supply of liquid, conduit means connecting said chamber and stock feeding mechanism, pump means maintaining liquid under pressure in said conduit means, an electric indicator when energized indicating the arrival of said point, a switch connecting said indicator and a source of energy, a float having an actuator arm, said float moving with the level of said liquid whereby said arm actuates the switch and connects the instrument with the source of supply when the liquid reaches a predetermined level in the chamber, and means adjusting said switch for actuation thereof at different levels in the chamber.

5. In stock feeding mechanism, a device for indicating the arrival at a predetermined location in said mechanism of a point on a length of stock being fed therein by relation to a quantity of fluid, comprising a chamber in which to store a supply of fluid, means connecting said chamber and stock feeding mechanism, other means maintaining the fluid from said chamber under pressure to said stock feeding mechanism, an indicator instrument to indicate said arrival, additional means movable with the change of the quantity of fluid in said chamber, and mechanism connecting said additional means and indicator instrument for actuating the instrument at a predetermined quantity of fluid remaining in said chamber.

6. In a stock feeding mechanism, a feed tube adapted to receive at one end a length of stock to be fed to a machine, a feed piston slidably mounted within said tube and engageable with the end of said stock, a fixed quantity of fluid, a chamber for holding said fixed quantity of fluid and communicating with the other end of said feed tube, means for drawing fluid from said chamber and delivering the same to said other end of said feed tube to maintain the tube filled with said fluid behind said piston, and means for indicating the position of the feed piston in said tube comprising means for measuring the quantity of fluid remaining in said chamber.

7. In a stock feeding mechanism, a feed tube adapted to receive a length of stock to be fed to a machine, a feed piston slidably mounted within said tube and engageable with the end of said stock, a fixed quantity of liquid, a chamber for holding said liquid and communicating with the end of said feed tube including the free end of said piston, means for drawing liquid from said chamber and delivering the same to the other end of said feed tube to maintain the tube filled with said liquid behind said piston, and means for indicating the position of the piston in said feed tube comprising alarm means for indicating when the level of the liquid in said chamber has reached a predetermined level.

References Cited in the file of this patent

UNITED STATES PATENTS

| | | |
|---|---|---|
| 1,324,522 | Saltzman | Dec. 9, 1919 |
| 2,021,655 | Jonas | Nov. 19, 1935 |
| 2,161,441 | Vickers | June 6, 1939 |
| 2,615,442 | Berry | Oct. 28, 1952 |